July 22, 1952  R. LECUIR  2,603,837
METHOD OF MANUFACTURING PLASTIC CERAMIC MASSES
FROM LAMELLAR ORGANIC SUBSTANCES
Filed May 14, 1949
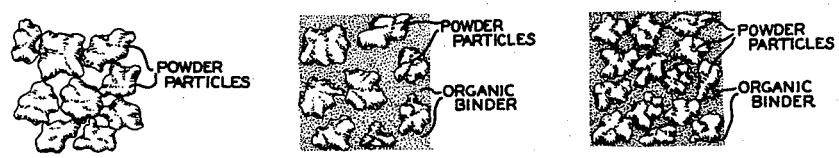
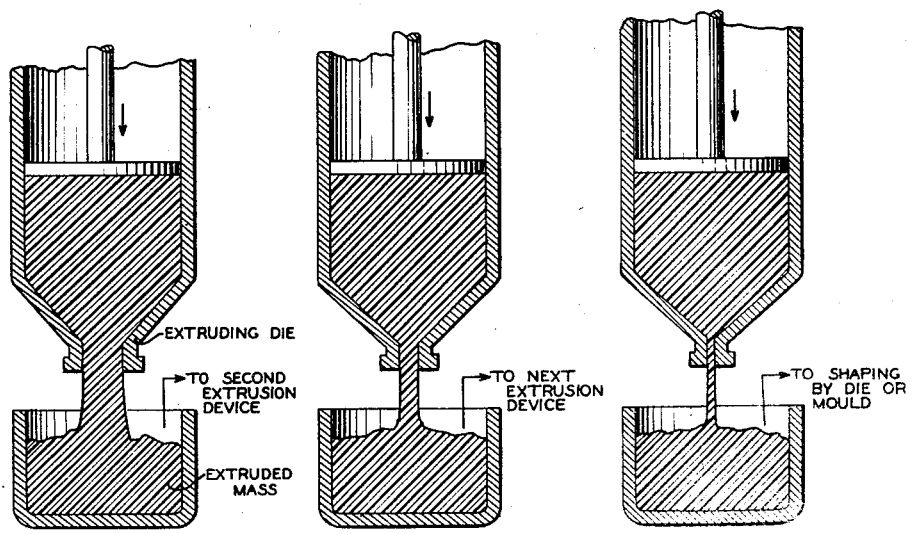
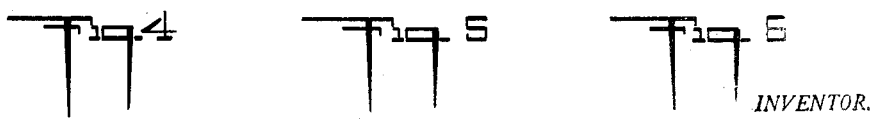
INVENTOR.
RENE LECUIR
BY
Hazeltine Lake and Co.,
AGENTS Patented July 22, 1952

2,603,837

UNITED STATES PATENT OFFICE 2,603,837

METHOD OF MANUFACTURING PLASTIC CERAMIC MASSES FROM LAMELLAR ORGANIC SUBSTANCES

René Lecuir, Paris, France, assignor to Compagnie Generale de Telegraphie Sans Fil, a corporation of France Application May 14, 1949, Serial No. 93,418
In France May 27, 1948

6 Claims. (Cl. 18—47.5)

This invention has for an object to obtain by starting with a powdered refractory substance, objects which are mechanically shaped and which are then baked.

In order to be able to shape the refractory powder it is necessary to render it plastic by means of a substance which at the same time serves as a binder.

Up to the present time one has generally utilized clay; but clay presents the double disadvantage of requiring its dilution in water, and of leaving after the final baking residues which alter the properties of the refractory substance.

It is possible to manufacture ceramic blocks or briquettes by using melted solids as binders; in this manner, the presence of a liquid such as water for example is avoided, the vapor tension of which produces, by surface desiccation, unevenness of composition.

On the other hand, drawing a mixture of a ceramic powder and a thixotrope gel enables a homogeneous compound to be obtained, the resistance of which to drawing decreases when the operation is repeated. The mechanical action of the friction and the rise of temperature produced thereby, simultaneously effect the wetting of the powder and the homogeneity of the mixture.

It has also been proposed to utilize organic binders which do not leave traces after their baking, but which always require water or other solvents.

Applicant has noticed in the course of his work that the employment of lamellar solid organic bodies, that is to say, bodies presenting themselves in thin lamellae which slide on each other like the lamellae of mica, slate, and the like, such as notably the organic soaps, enables the elimination of the two mentioned disadvantages. The conditions imposed respecting these bodies are (1) to plasticize sufficiently at the time of shaping of the object to be manufactured, while maintaining a sufficient cohesion; (2) to leave no residue by calcination.

My invention has precisely for its object to combine the two methods of melting and drawing and apply them to an organic binder which is characterised by its lamellar structure and can be completely destroyed by calcination.

According to the invention, use is made, not of a lamellar substance in suspension, but of a comparatively hard lamellar organic substance in the solid state, which can be readily cut with a knife and is of a similar consistency to ceresine. In order to ensure a suitable wetting of the mineral powder to be treated, it is necessary in this case to subject the mixture to a heat treatment so as to liquify said organic substance. A mass is thus obtained which consists of powder particles surrounded with a lamellar organic substance. The plasticity of which mass, although much greater than that obtained by using a non-lamellar fusible solid, is still not sufficient for giving it the final form. In order to increase the plasticity, a mechanical treatment is effected during which the wetting and the homogeneity are increased by the action of the pressure and the heating due to friction. This also produces an increase in the density by eliminating the air from between the grains of powder.

In the accompanying drawings Figures 1 to 3 illustrate schematically the appearance of the materials treated according to this invention and Figures 4 to 6 illustrate the apparatus used.

In practice, the desired purpose is attained by successively passing the mass through dies of gradually decreasing diameters. The mass obtained can then be drawn, pressed, and machined with all the advantages inherent to a lamellar structure, i. e. a plasticity similar to that of clay is in this case replaced by an organic binder presenting the same lamellar properties as clay. At the same time the method enables one to avoid the drawbacks due to the presence in the mixture of a liquid such as water that has a certain degree of vapor tension.

The die apparatus may be of a conventional type such as that shown in Figure 5 and which comprises a body 3, a piston 4, a removable discharge tip 5, and the substance 6 to be extruded or drawn.

The plasticity continues to increase after each step without there being a diminution of the cohesion in like proportion. There is always obtained a thread at the output of the discharge tip 5. This is due to the thixotropic character of the lamellar body. Besides, at each passing through the die the homogeneity of the thread is improved.

By way of example, a description will now be given of the application of the method of the invention to the preparation of alumina threads of 0.5 millimetre diameter. To alumina powder that was passed through a 300 mesh screen (illustrated schematically in Figure 1), add 15% by weight of the substance obtained by saponifying 790 gm. of tristearin with 450 gm. of triethanolamine to obtain the mixture illustrated in Figure 2. Mix the mass at a temperature of 100° C. to obtain the mixture illustrated in Figure 3 and after cooling pass it through successive extruding dies of the following diameters: 24 mm., 10 mm., 6 mm., 4 mm., 2 mm., 1 mm., three of which are shown in vertical section in Figures 4 to 6. After the last extruding operation through the 1 mm. die, the obtained plastified mass is shaped by an extrusion through a 0.5 mm. extruding die giving a 0.5 mm. thread. Then bake said thread; the calcination destroys the organic substance and a thread only comprising the alumina remains. The same result could be obtained by treating the mass while it is still hot, or by heating the body of the die.

The mass obtained may also be treated in a press and formed into the most varied shapes such as crucibles or high-relief moulds.

What I claim is:

1. The method of manufacturing ceramic articles which comprises in adding to a mineral powder a solid fusible organic binder having a lamellar structure, heating them until the binder melts, mixing them together at the same time, cooling the mass so obtained, extruding this mass through a given extruding die thereby increasing its plasticity, extruding the mass so obtained through a second die of a smaller diameter, repeating this operation until there is obtained a mass having desired plasticity, then pressing this definitely plastified mass into an article of desired form and baking it.

2. The method of manufacturing ceramic articles which comprises adding to a mineral powder a solid fusible organic binder comprising an organic chemical derivative of a fatty acid and having a lamellar structure, heating them until the binder melts, mixing them together at the same time, cooling the mass so obtained, extruding this mass through a given extruding die thereby increasing its plasticity, extruding the mass so obtained through a second die of a smaller diameter, repeating this operation until there is obtained a mass having desired plasticity, then pressing this definitely plastified mass into an article of desired form and baking it.

3. The method of manufacturing ceramic articles which comprises adding to a mineral powder a solid fusible organic binder obtained by saponifying an ester by an organic base and having a lamellar structure, heating them until the binder melts, mixing them together at the same time, cooling the mass so obtained, extruding this mass through a given extruding die thereby increasing its plasticity, extruding the mass so obtained through a second die of a smaller diameter, repeating this operation until there is obtained a mass having desired plasticity, then pressing this definitely plastified mass into an article of desired form and baking it.

4. The method of manufacturing ceramic articles which comprises adding to a mineral powder a solid fusible organic binder obtained by saponifying tristearin with triethanolamine, heating them until the binder melts, mixing them together at the same time, cooling the mass so obtained, extruding this mass through a given extruding die thereby increasing its plasticity, extruding the mass so obtained through a second die of a smaller diameter, repeating this operation until there is obtained a mass having desired plasticity, then pressing this definitely plastified mass into an article of desired form and baking it.

5. The method of manufacturing ceramic articles which comprises adding to a mineral powder a binder obtained by saponifying tristearin with triethanolamine in the proportion of substantially 790 grams of tristearin to 450 grams of triethanolamine, heating them until the binder melts, mixing them together at the same time, cooling the mass so obtained, extruding this mass through a given extruding die thereby increasing its plasticity, extruding the mass so obtained through a second die of a smaller diameter, repeating this operation until there is obtained a mass having desired plasticity, then pressing this definitely plastified mass into an article of desired form and baking it.

6. The method of manufacturing ceramic articles which comprises adding to a mineral powder substantially 15% of a binder obtained by saponifying substantially 790 grams tristearin with 450 grams triethanolamine, heating them until the binder melts, mixing them together at the same time, cooling the mass so obtained, extruding this mass through a given extruding die thereby increasing its plasticity, extruding the mass so obtained through a second die of a smaller diameter, repeating this operation until there is obtained a mass having desired plasticity, then pressing this definitely plastified mass into an article of desired form and baking it.

RENÉ LECUIR.

REFERENCES CITED

The following references are of record in the file of this patent:

UNITED STATES PATENTS

| Number | Name | Date |
| --- | --- | --- |
| 287,699 | Meeker | Oct. 30, 1883 |
| 1,183,427 | Brown | May 16, 1916 |
| 1,477,094 | Wilson | Dec. 11, 1923 |
| 1,930,736 | Burrell | Oct. 17, 1933 |
| 2,291,873 | Brubaker | Aug. 4, 1942 |

FOREIGN PATENTS

| Number | Country | Date |
| --- | --- | --- |
| 367,828 | Great Britain | Feb. 18, 1932 |